United States Patent [19]

Wang

[11] Patent Number: 5,701,678
[45] Date of Patent: Dec. 30, 1997

[54] SPACE-TIME TRACKER

[76] Inventor: Jen-Hu Wang, Suite 2, 7F, No. 95-8 Chang Ping Road, Sec. 1, Taichung, Taiwan

[21] Appl. No.: 587,650

[22] Filed: Jan. 17, 1996

[51] Int. Cl.$^6$ ........................................ G04B 19/26
[52] U.S. Cl. ........................ 33/268; 33/269; 368/15; 434/284
[58] Field of Search ................. 33/268, 269, 15 C, 33/15 D, 457; 434/284, 287, 288, 289, 291; 368/15, 16, 17, 20, 10, 14

[56] References Cited

U.S. PATENT DOCUMENTS

| | | | |
|---|---|---|---|
| 246,061 | 8/1881 | Blair | 368/16 |
| 531,060 | 12/1894 | Ormsby | 434/284 |
| 792,336 | 6/1905 | Lewis | 434/284 |
| 832,527 | 10/1906 | Barritt | 434/289 |
| 3,766,727 | 10/1973 | Didik | 368/15 |
| 5,253,225 | 10/1993 | Vaucher | 33/269 |
| 5,450,674 | 9/1995 | Jen-Hu | 33/268 |
| 5,457,663 | 10/1995 | Mejaski | 368/15 |

*Primary Examiner*—Christopher W. Fulton

[57] ABSTRACT

A space-time tracker for announcing the time and tracking the celestrial bodies on the spot of observation comprises a clock mechanism with clock hands on a dial of 24 hours and a synchronic motor for driving a star atlas and a plurality of planet driving devices which actuate a plurality of annular displays moving around a moon/star ring to periodically show an on spot planet thereon. The space-time tracker also indicates the variations or deviations of the solar calendar and the lunar calendar and the times of different time zones around the world. This disclosure is characterized in automatically and perfectly demonstrating the relationship between the time and space.

23 Claims, 10 Drawing Sheets

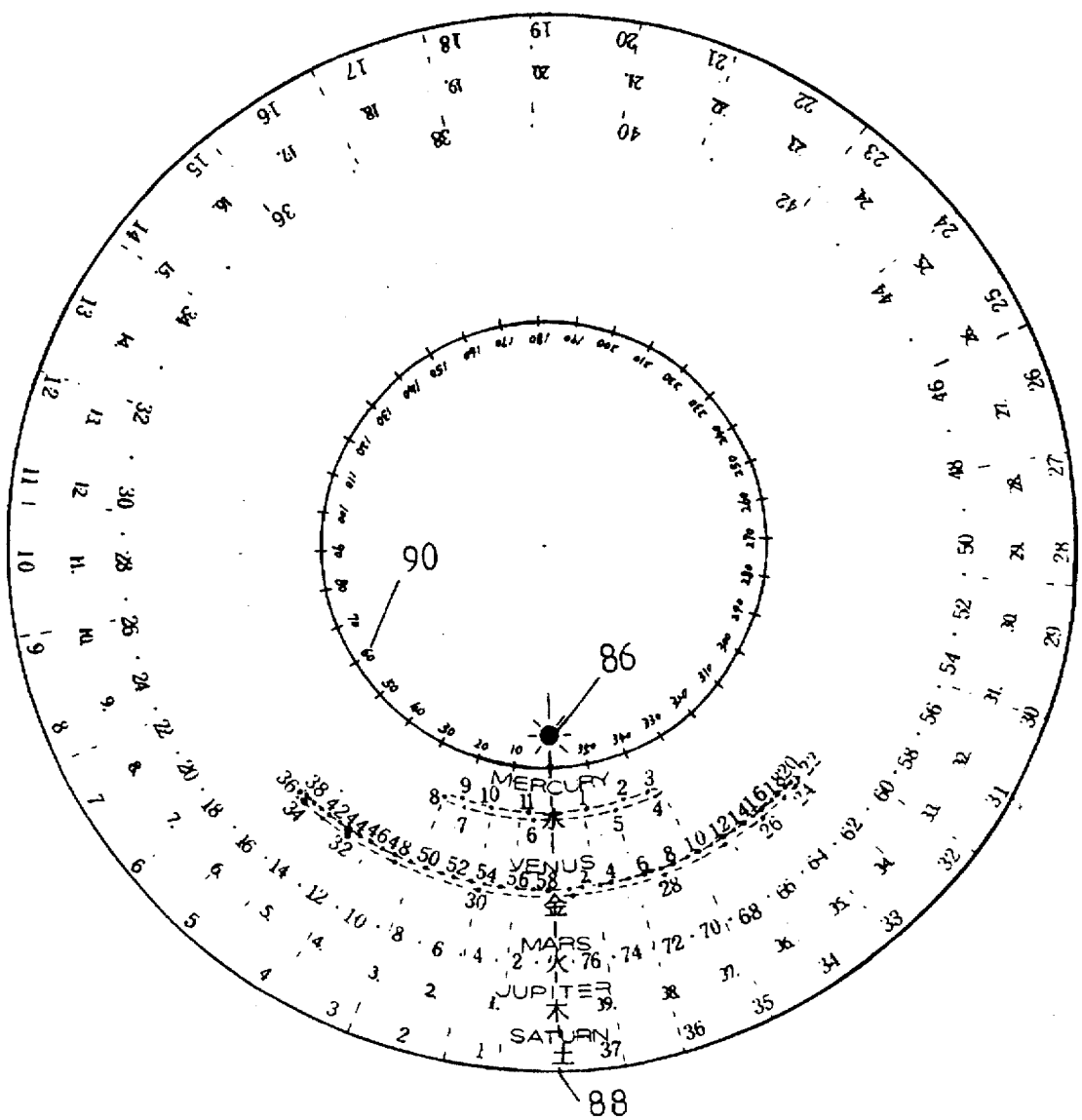
F I G. 3

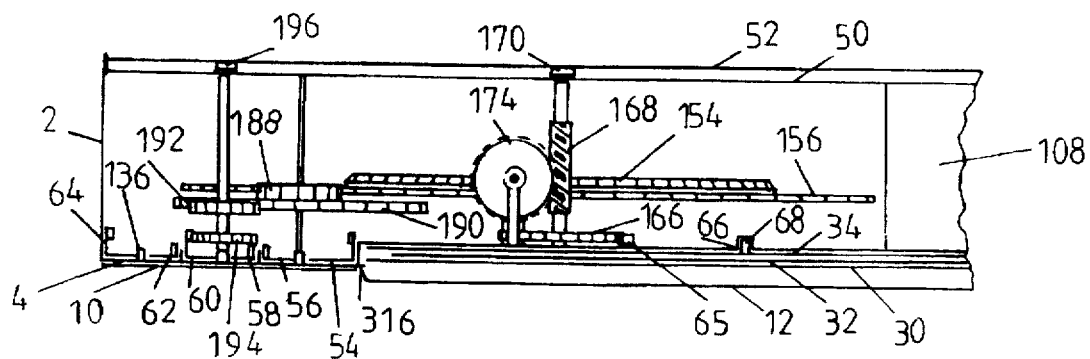
F I G 7
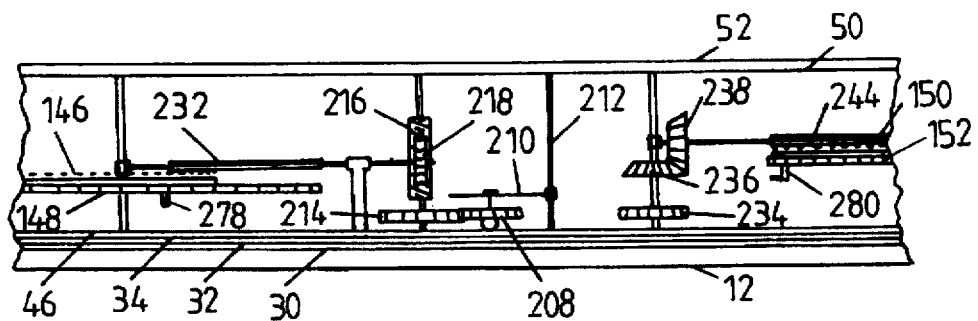
F I G. 8

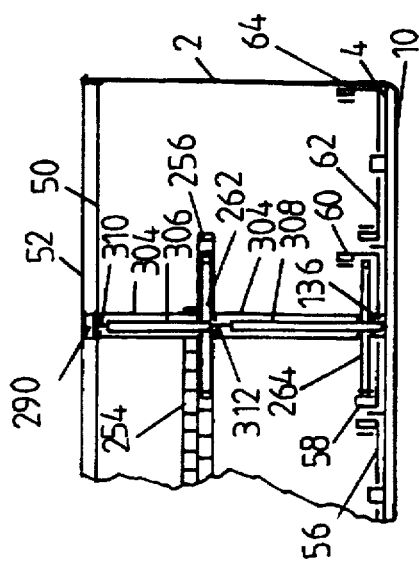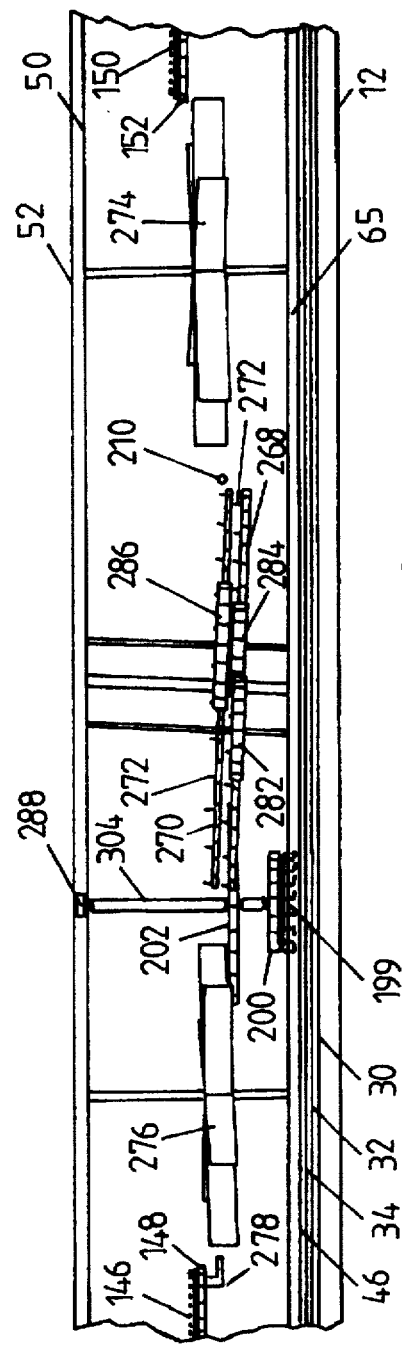

SPACE-TIME TRACKER

BACKGROUND OF THE INVENTION

The present invention relates to astronomical observation apparatus, and more particularly to a space-time tracker which announces the time and simultaneously tracks out the celestrial bodies to determine the moon phase and the positions of the planets on the spot of observation.

Long time ago, people used to observe the celestrial phenomena by taking the earth as the center of the universe. After they understood that the earth circulates around the sun, they became aware of that the sun should be centered on space observation. Actually, up to now, insofar as we are aware, there is no absolute center in our universe, the movement among celestrial bodies relates to one another, the observation spot can be centered at any where if necessary. So that it seems to return back to ancient time and follows to our ancestors that the most convenient center to observe the universe is on the spot of the observer himself. That's why the celestrial coordinates on the celestrial sphere are projected from the geographical coodinates of the earth.

In modern physics, it is understood that the time coodinates and the space coordinates are interchangable and the time may be meant the fourth space, therefore people combine the time with space into one aspect in their mind and desire to study the relationship as well as the mutual effect between the time and space.

There was a description of a water actuated armillary sphere in ancient China about a thousand years ago which automatically announces the time and simultaneously demonstrates the celestrial phenomena on the spot. In the recent time, the Patake Philippe Clock Co. of switzerland provides a celestrial watch except time calendar, can demonstrate the moon phase, sunrise and sunset and attaches a perfect star atlas in the case. Galileo astronomical watch is of the most complicated and precise one in Guinness Book of Records, it demonstrates 24 hours a day, the months, signs of the Zodiac, the altitudes and angles of the sun and moon, solar and lunar eclipse and etc. Tellurium Johnannes Kepler is the first one to attach a terrestrial map in his universal calendar, and Planetarium Copernicus is the first one in Guinness Book of Records to provide an astronomical watch which includes the circulation of the moon around the earth and the circulations of the planets in the solar system.

Several years ago, I have disclosed an Automatic Tracking Astronomical Globe, U.S. Pat. No. 5,344,325 which was provided in accordance with the ancient armillary sphere and the modern celestrial sphere, and then provided a Multipotent Astrolabe, U.S. Pat. No. 5,459,874 which was designed by reference to a star dial. However, they still lack popularity. This space-time tracker is provided in accordance with the above recited Multipotent Astrolobe and the structure and system of the astronomical watches in order to automatically and perfectly demonstrate the interchanges between time and space and to be applicable popularly in an office, a family or an individual.

SUMMARY OF THE PRESENT INVENTION

The present invention has a main object to provide a space-time tracker which combines a 24 hours clock dial with starwatching instrument so as to automatically demonstrate the relative positions of the moon, the sun and the stars as viewed from the earth and taking into account the ephemeral time in order to find out the interchange between the time and space.

Another object of the present invention is to provide a space-time tracker in which a plurality of driving devices are included to respectively actuate a plurality of annular displays moving around the tracker to periodically demonstrate the planets on the spot.

Further object of the present invention is to provide a space-time tracker which is portable and applicable to the popularity.

Accordingly, the space-time tracker of the present invention comprises generally a circular case integrated with a Keen/star ring and a seat plate, a star atlas, a transparent terrestrial map, a transparent fixed latitude observation chart and the clock hands sequentially and movably secured on the seat plate wherein the hour hand is combined into the terrestrial map and the fixed latitude observation chart therebetween and circulated once per 24 hours, a transparent date/hour ring, having 24-hour graduation, solar and lunar calendars and a solar symbol with a date pointer thereon. The minute hand circulates once an hour and the second hand circulates once a minute. Both the terrestrial map, the fixed latitude observation chart and the clock hands engage with a spindle at the center of the tracker and are operated by a clock mechanism therein. The star atlas is operated by a synchronic motor and circulates once per a year round. On the surface of the moon/star ring, there are a plurality of windows of different signs which are functioned in cooperation with a plurality of movable annular displays. thereunder. A plurality of planet driving devices drove by the synchronic motor dispose on the back side of the seat plate for operating respective movable annular displays to move around the moon/star ring thereunder in different speed in order to periodically emerge the moon, the sun and the stars in the windows of signs.

The sun mark located at the 12-hour of the dial in cooperated with a terrestrial map of polar projection can determine the high-noons within different time zones around the world.

The stars atlas which is centered at the celestrial pole includes the constellations, ecliptic and the calendar of 12 months. A plurality of small circles are concentrically disposed adjacent the calendar, each small circle represents seven days a week) of the calendar. If the pointer from the sun mark points a date on the same day and same week, depict a straight line from the pointer to the center of the tracker along a celestrial maridian, so that the conjunction on the ecliptic is the present position of the sun on the celestrial sphere as it is projected from the center of the earth.

The fixed latitude observation chart (as shown in FIG. 11) includes the coordinates of the horizontal plane, the zenith, the nadir and the azimuth thereon which in combination with the terrestrial map can determine the altitude and azimuth of a celestrial body relative to the spot of observation. Because different charts are need to cope with different latitude, a combination of the fixed latitude observation charts in color is provided as shown in FIG. 12.

Except Pluto, the orbits plane of the planets in our solar system are rather close to the ecliptic plane, the phase angles between their orbital plane and the sun are in periodical changes. Since their average orbital radius as well as their orbital periods are known, thus the period of conjunction or opposition for them are equally feasible. As we know that this period for Mercury is 116 days, for Venus is 584 days, for Mars is 780 days, for Jupiter is 399 days, for Saturn is 378 days, for Uranus is 369.6 days, for Neptune is 367.5 days and for Pluto is 366.7 days, wherein the orbital periods of the Uranus, the Neptune and the Pluto are rather long, they respectively are 84 years, 164.8 years and 247.7 years, therefore, their displacement on the celestrial sphere are rather small. To mark their locus within several years directly on the star atlas (as shown in FIG. 1) is reasonable. Other planets such as the Venus, the Jupiter, the Mercury, the Mars and the Saturn have their periodical phase angle displacement relative to the sun as shown in FIG. 3, in which the numerals respectively mark up the dates of conjunction for them. The unit of those numerals is Ten-days.

Referring to FIG. 4, shows an oval internal tooth band 102 meshed with an circular external tooth band 104. The internal tooth band 102 which is in eccentric curve has very thin tooth formed perpendicularly to the circumferential surface thereof and rotates in concentrical with the external tooth band 104. If an elongate pinion points to the co-revolving center of both the internal and external tooth bands and meshes with the internal tooth band 102 and is driven it in a predetermined speed, when the vertical components of the displacement along the diameters of the internal tooth hand 102 per unit time is a constant C, the displacement of the external tooth band 104 is a variable S, $\because Ci = C = ri\theta i$ $Si = R\theta i$ $\therefore ri = (RC) + Si$ If $ri \leq R$, and When $R, C, S_1, S_2, \ldots Sn$ in above equations are known, $r_1$, $r_2 \ldots r_n$ can be determined.

Wherein R is the radius of the external tooth band and is also a constant, $S_1$, $S_2$, ... Sn are the displacements of a planet relative to the sun per unit time, $r_1$ is the minimum radius of the internal tooth band 102 and $r_n$ is the maximum radius thereof. Further, within the period of conjunction, the displacement of a planet at any unit time is symmetrical on the diameter of the external tooth band 104, thus, the half circumference of the internal tooth band 102 can be circumscribed.

Accordingly, the internal tooth band 158 for Jupiter driving device and the internal tooth band 154 for Mars driving device are circumscribed as shown in FIG. 5.

Because the orbital displacement of the Venus and Mercury relative to the sun includes both normal course and inverse course, thus, each of them need a pair of driving devices to coped with, and because the quantity of their displacements per unit time are greatly different such as $S_1 >> Sn$ and $r_1 << r_n$, the curves of their internal tooth band will be greatly eccentrical and can not be substantially operable, thus, proper modifications are required. Firstly, let them stop for ten days at their alternative spot and secondly adapt to an average displacement quantity to substitute for the minimum displacement of them within several ten days, therefore, the normal course and inverse course internal tooth band 146, 150, 138 and 142 for Venus and Mercury are respectively circumscribed as shown in FIG. 5. This revolution mode is similar to that of the moon.

The present invention will become more fully understood by reference to the following detailed description thereof when read in conjunction with the attached drawings.

BRIEF DESCRIPTION OF THE DRAWINGS

FIG. 3 is a plane view for the description of the phase angle displacement of the conjunction period for the planets (the unit is Ten-days), FIGS. 6 to 10 are the sectional views to separately illustrate the driving devices of the present invention.

DETAILED DESCRIPTION OF THE PREFERRED EMBODIMENT

Figure 1:
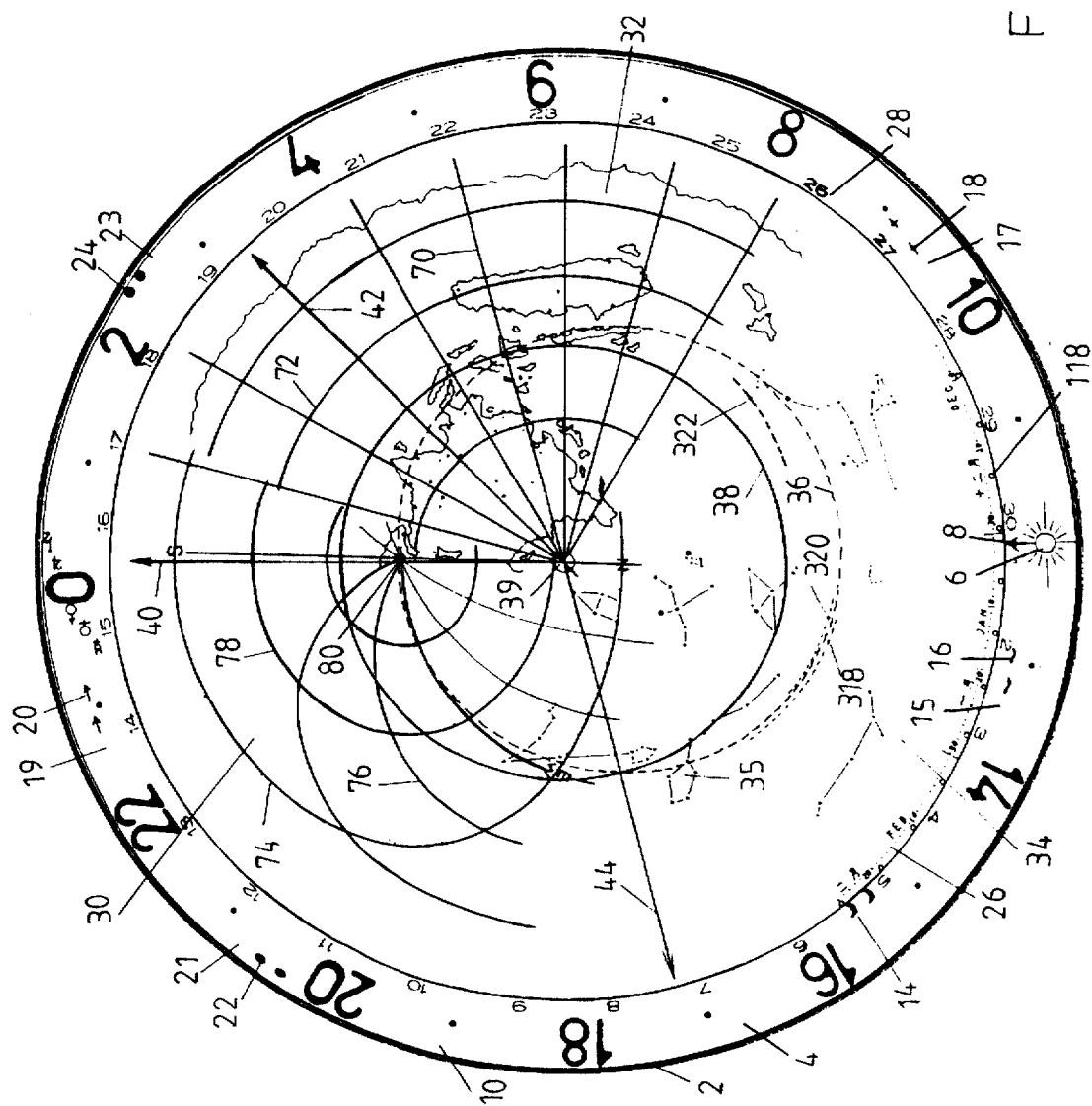
FIG. 1 is a front view to show the preferred embodiment of the present invention.
Figure 2:
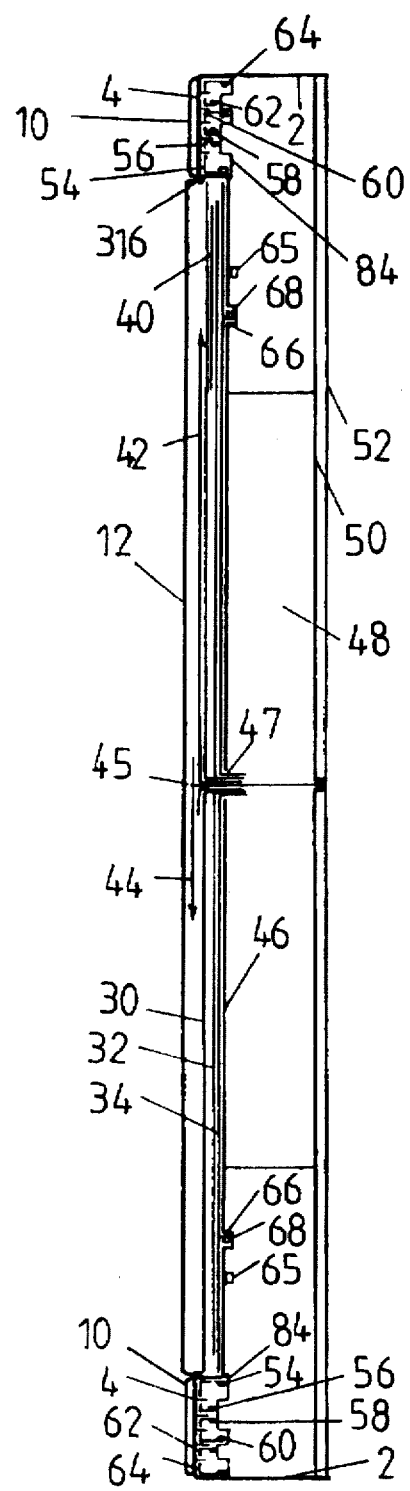
FIG. 2 is a side section of FIG. 1 (without showing the internal mechanism)
Figure 4:
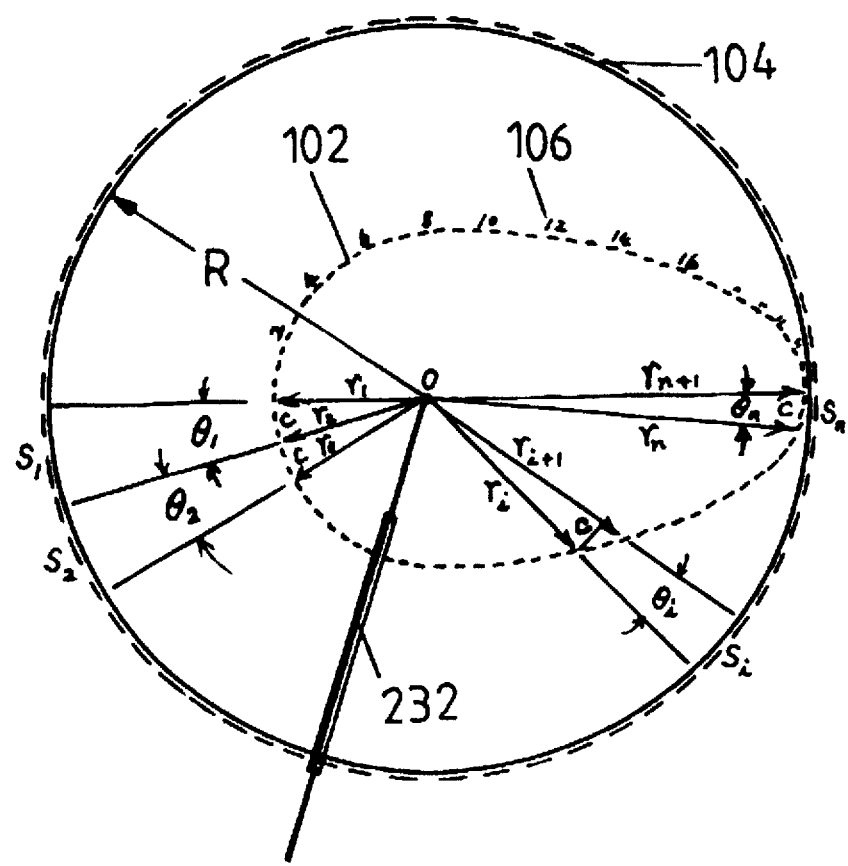
FIG. 4 is a diagram to illustrate the construction of the oval internal tooth bands.

With reference to FIGS. 1 and 2 of the drawings, the space-time tracker of the present invention comprises generally a circular case 2 integrated with a moon/star ring 4 and a base plate 46 to define a support for other components which are enclosed by a transparent face 12, a transparent date/hour ring 10 and a back cover 52, wherein the transparent date/hour ring 10 fixedly attached to the moon/star ring 4 includes a 24-hour graduation thereon, a sun mark 6 located at the 12 hour abutting a date pointer which points at the date of the Gregorian calendar inside the date/hour ring 10 and the lunar month of the lunar calendar 28 adjacent the Gregorian calendar. The moon/star ring 4 includes a moon phase arc 14, a Mercury arc 15, a Venus arc 17, a Mars circle 19, a Jupiter circle 21 and a Saturn circle 23. Windows of different signs representing the moon and the planets are spacedly engraved on those arcs or circles such that the sign of moon phases indicate the relative positions of the moon, the sign of waves indicate the position of Mercury arc 15, the sign of cross indicates the position of Venus arc 17, the sign of arrow indicates the position of the Mars circle 19, the sign of ellipse indicates the position of the Jupiter circle 21 and the sign of circle indicates the position of the Saturn circle Under the moon/star ring 4 and relative to the positions of the windows is the annular displays on which are the small color bands so that when any color band on the display appears in alignment with its relative window of sign, it means that the planet is on the spot at that time. This arrangement depends on that the circulations of those annular displays along the moon/star ring 4 represent the revolutions of the planets around the sun. Further, the annular displays are in the same color as that of the moon/star ring 4, except a small part of above recited color band on each of them, so that there is normally not any contrasty between the windows and the surface of the moon/star ring 4.

There are several circular plates concentrically superimposed in the space-time tracker, the seat 46 lays at the lowest position and sequentially is the star atlas 34, the terrestrial map 32, the fixed latitude observation chart 30 and the transparent face 12 which is at the uppermost position.

The star atlas 34 has a celestrial pole 39 thereon (FIG. 1 shows the star atlas which is flattened concentrically to the north celestrial pole), the constellations 35, the ecliptic 36, the celestrial equator 38, the Uranus 318, the Neptune 320, the Pluto 322 and a circumambiant solar calendar 26 which indicates the days of a year round. The star atlas 34 circulates once a year in the space-time tracker, each shift of a graduation equals to the passage of a day.

The terrestrial map 32 which is a world atlas flattened with polar projection includes the locations of the major cities, the maridians 70 between the time zones and the latitudes 72 across the maridians.

Figure 12:
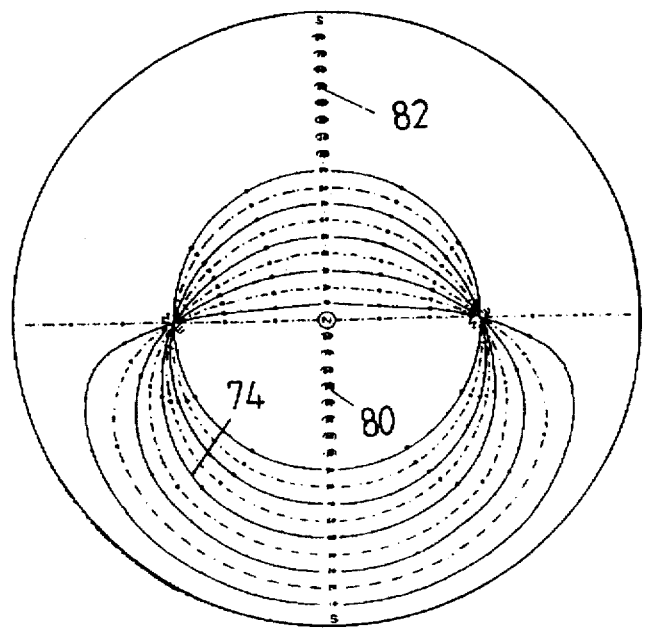
FIG. 12 is a diagram to show a combination of the fixed latitude observation charts.

The fixed latitude observation chart 30 includes the zenith 80, the nadir 82, the horizontal circle 74, the azimuth line and the line of elevation angle 78. The latitudes on the fixed latitude observation chart 30 are varied from different observation zone, but it will be combined together in a major chart 30 as shown in FIG. 12. The zenith 80 is corresponding to the observation spot on the terrestrial map 32. Both the fixed latitude observation chart 30 and the terrestrial map 32 are made from flat transparent plastic material and combined with one another, including a hour hand 40 disposed therein-between by static induction effect. The hour hand disposes along a standard maridian at an observation spot in a time zone. The combined three components swing synchronously and circulate once a day within the moon/star ring 4. A minute hand 42 and a second hand 44 are sequentially disposed thereupon and swung in their speeds as that of the conventional clocks. They are protected by a transparent face 12 which has a circumferential thread therearound engaged with a protrudent flange 316 from the moon/star ring 4. If the fixed latitude observation chart 30 is to be adjusted or changed, disengages the transparent face 12 with the flange 316 and removes the second hand 44 and the minute hand 42 sequentially from a spindle 45, then the fixed latitude observation chart 30 is adjusted or changed. To return to normal state will be done by reverse process.

Figure 5:
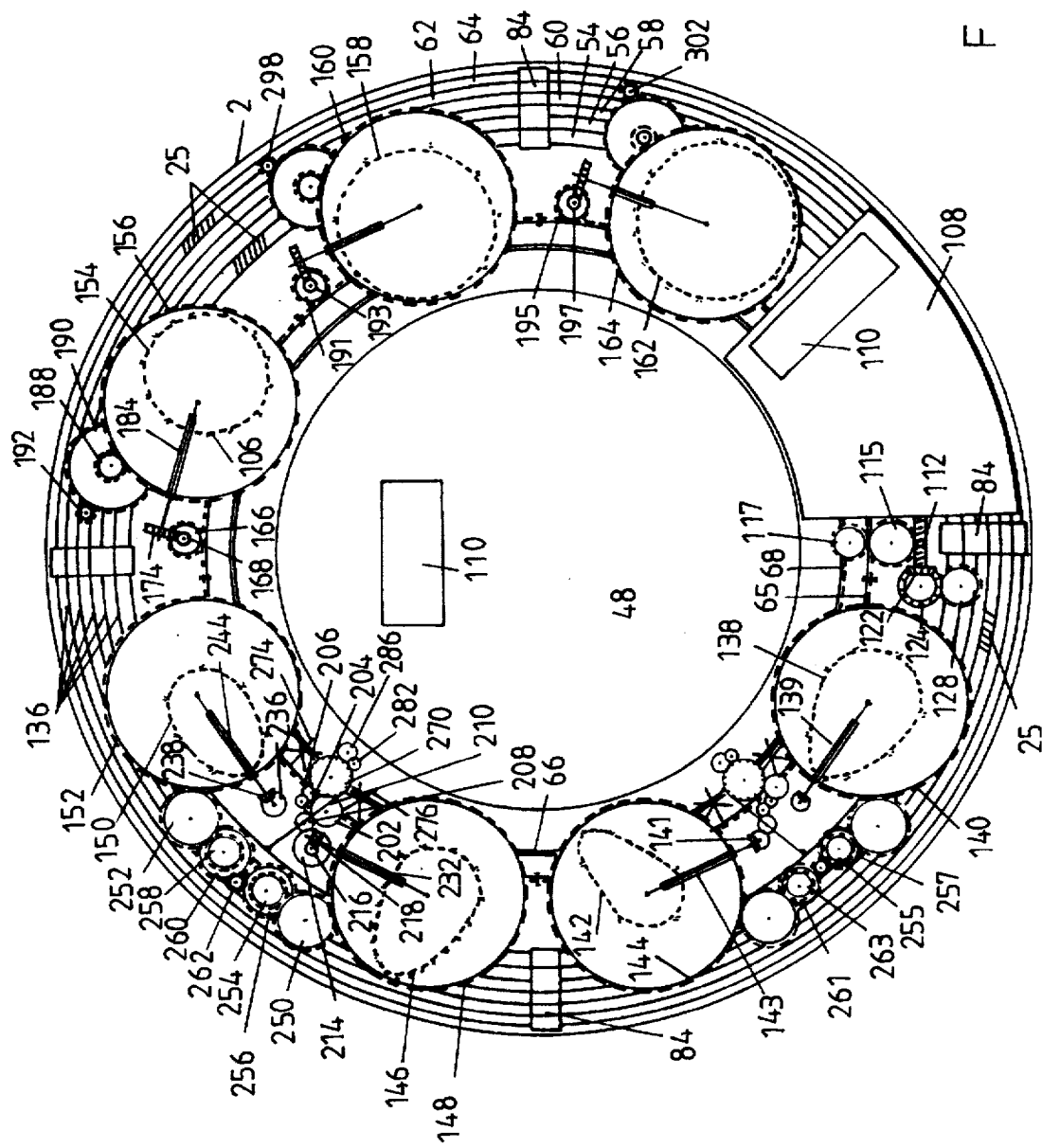
FIG. 5 is a rear side view of the space-time tracker of the present invention, while the back cover is removed.

Referring to FIG. 5 of a rear side view of the space-time tracker in which the components are shown after the removal of an accessary plate 50 and a back cover 52. You will see that a clock mechanism 48 with a battery cell 110 dispose in a circular chamber at the center of the tracker, the mechanism 48 is no different from that of a quartz clock, but the rotation to move the hour hand is in half speed in comparison with that of the conventional quatz clock. So that the hour hand circulates once upon 24 hours. Above the clock mechanism 48 is the seat plate 46 which has a central aperture 47 for passing through the spindle 45 from the mechanism 48 in order that the chart, the atlas and the hands rotatably dispose thereon. The seat plate 46 has an annular tooth slot 66 thereon for engaging with a tooth band 68 to drive the star atlas 34 and a general tooth band 65 is also movably secured in the seat back of the seat plate 46 for driving the driving devices of the annular displays so that the planets of solar system revolute thereon. Outside of the seat plate 46 shows the backside of the moon/star ring 4 which has six concentrical circular slots defined by five concentrical separator rings 136. The six circular slots are provided to respectively receive the moon phase annular display 54, the Mercury annular display 56, the Venus annular display 58, the Mars annular display 60, the Jupiter annular display 62 and the Saturn annular display 64 therein and are protected by four ribs 84 which are fixed spaced apart to the back side of the moon/star ring 4.

Figure 6:
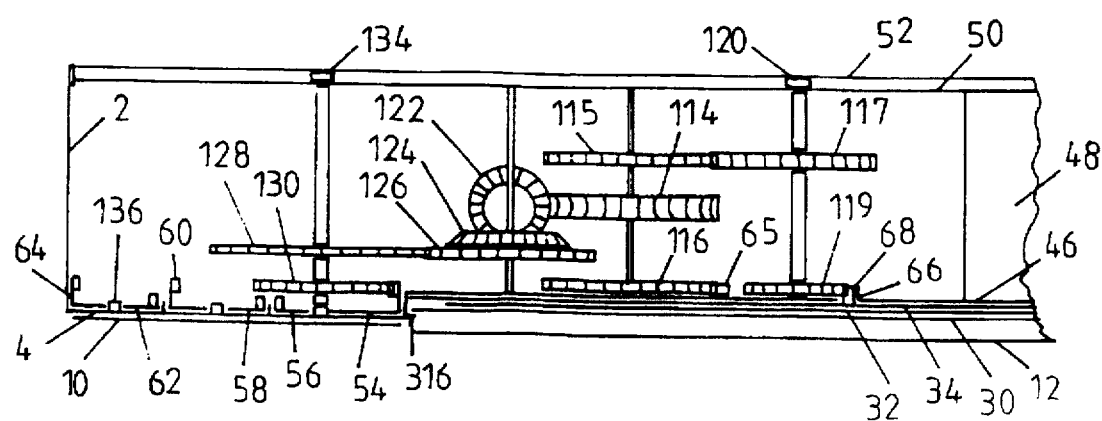
Figure 11:
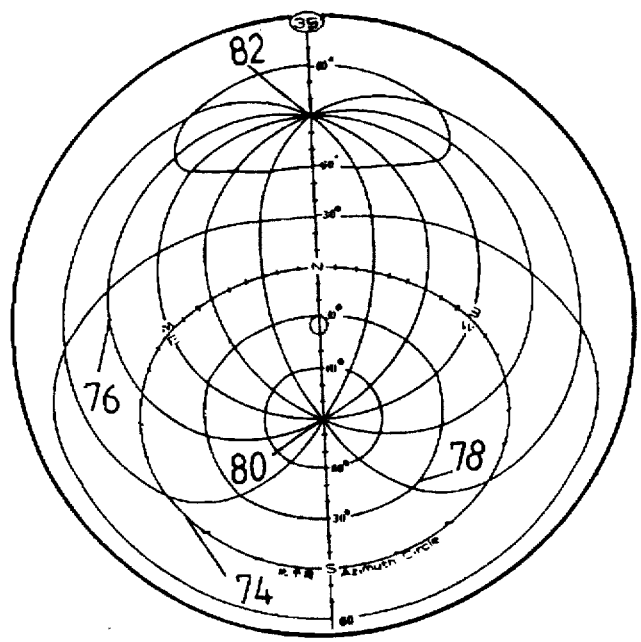
FIG. 11 is a diagram to show a fixed latitude observation chart of the present invention.

A quatz and I.C. synchronic motor 108 with a battery cell 110 are fixed to the seat plate 46, a worm stem 112 sequentially drives a worm wheel 114 and gears 115, 117 and 119 and through the opening of the tooth slot 66 further drives the star atlas 34 and it's tooth band 68 rotates simultaneously (as shown in FIG. 6).

The star atlas tooth band has totally 365 tooth, and the worm stem 112 rotates a circle per a day. It is understood that each circle as rotated by the worm stem 112 can shift the star atlas tooth band 68 forward a teeth width per a day and the star atlas circulates once per a year. A bevel gear 122 perpendicular to the free end of the worm stem 112 drives sequentially a bevel gear 124, gears 126, 128 and 130, and the moon annular display 54 to rotate. Since the bevel gear 122 has 10 tooth therearound and rotates in concert with the worm stem 112, it means that the bevel gear 112 forwards 10 tooth a day and the gear 124, 126, 128 and 130 all forward 10 tooth a day. If there are 295 tooth on the moon annular display 54, thus a circulation of the moon annular display 54 spends 29.5 days which equals to an orbital period of the lunar month. A small color band 25 on the moon annular display 54 copes with the shift of the dates and windows on the date/hour ring 10 and the moon/star ring 4 and leads the result to the ecliptic 36 along a maridian line, then the daily positions of the moon phase are determined.

The Mars annular display 60 is driven firstly from gear 116 which is driven by the general tooth band 65 (as shown in FIGS. 5 and 7) and then the gear 166 drives sequentially a worm stem 168, a worm wheel 174, an elongate pinion 184, an oval Mars internal tooth baud 154, a circular Mars external tooth band 156 and gears 188, 190, 192 and 194.

The Jupiter annular display 62 and the Saturn annular display 64 have their driving devices similar to that of the Mars annular display 60 as recited above. But the number of tooth on their bevel gears are different from one another. However, the general tooth band 65 has 365 tooth thereon and each shift of a teeth spends a day. It is understood that the conjunction period of the Mars is 780 days. Since the internal tooth band 154 has 78 tooth therearound and the gear 166 has 10 tooth at all, through the rotation of the worm stem 168 and the worm wheel 174 to drive the elongate pinion 184 for shifting a teeth per 10 days, the internal tooth band 154 and its meshed external tooth band 156 will be driven to circulate once per 780 days. Because of that the circumferential length of the gear 188 per that of the gear 190 equals to the circumferential length of the Mars external tooth band 156 per that of the Mars annular display 60, the annular display 60 together with its color band 25 will be driven by the external tooth band 156 to circulate once per 780 days around the moon/star ring 4. To depict the result along an adjacent maridian to the ecliptic as shown in FIG. 1, the daily location of the Mars is therefore determined.

Similarly, the conjunction period of the Jupiter is 399 days, so that the Jupiter internal tooth band 158 has to be 80 tooth and the gear 191 has 10 tooth thereon and the worm stem 193 is composed of a pair of worm stems. This arrangement facilitates the Jupiter internal tooth band 158 and the external tooth band 160 shifting a teeth per 5 days in order to drive the Jupiter annular display 62 to circulate once per 400 days. It apparently makes one day difference. But this error is least and negligible.

The conjunction period of the Saturn is 378 days. The Saturn internal tooth band 162 has 63 tooth and the gear 195 has 12 tooth and the worm stem 197 is also composed of a pair of worm stems. So that the Saturn internal tooth band 162 and the external tooth band 164 shift a teeth per 6 days. Thus the Jupiter annular display 64 together with its color band thereon are driven synchronously to circulate once per 378 days.

Referring to FIGS. 5, 8, 9 and 10 of the drawings, because of that the Mercury and Venus are of the internal planets, there are both normal course and inverse course included in thier conjunction periods, thus, their driving devices are doubled and have to be alternately operated in this space-time tracker. The Venus driving device is started by the tooth band 65, it sequentially drives gears 199, 200 and 204, clutch gear 208, gear 214, worm stem 216, worm wheel 218, elongate pinion 232, Venus inverse course internal tooth band 146, Venus inverse course external tooth band 148, gears 250 and 254, one-way gear 256, gear 262 and 264 and finally, the Venus annular display 58 which is driven together with its color band 25 to move inversely along the moon/star ring 4. When a push lever 278 under the external tooth band 148 closes on and actuates a nearby six-leaf rotor 276 which pushes a flexible clutch lever 210 engaged with a normal course tooth plate 268 and combined with a short pin 272 therein, simultaneously, a gear 202 drives the tooth plate 268 to rotate normally as shown in FIG. 10. In the same time, the clutch lever 210, at the short pin 272, together with the clutch gear 208 are actuated to move transversely away from to be meshed with gear 214 and 204 so as to stop the Venus sign 18 from inverse movement. When the clutch lever 210 pivoted on a support axis 212 is pushed to shift to other side away from the short pin 272 and the normal course tooth plate 268, the clutch gear 208 immediately meshes with gears 206 and 234 which begin to rotate in normal course again. This time, the gear 200 drives sequentially gears 204 and 206, clutch gear 208, gear 234, bevel gears 236, 238 and elongate pinion 244, Venus normal course internal tooth band 150, normal course internal tooth band 152, gears 252 and 258, one-way gear 260, gear 262 and the Venus annular display 58 which moves in normal course until that the color band 25 reaches to the push lever 280 under the normal course external tooth band 152. The push lever 280 actuates the six-leaf rotor 274 which in turn pushes the clutch lever 210 closing on the inverse course tooth plate 270 and into short pin 272 thereabove, while the normal course tooth plate 268 and the inverse course tooth plate 270 become superposed and coaxial and slightly inclined so as to shift the clutch lever 210 from the left side in order to engage with the inverse course tooth plate 270. The normal course tooth plate 268 also drives sequentially the gears 282, 284 and 286, the inverse course tooth plate 270 and the short pin 272 thereabove to rotate inversely to disengage the clutch lever 210 and the clutch gear 208 from with the gears 206 and 234 and to stop the Venus annular sign 18 from normal movement. When the clutch lever 210 is shifted again to the other side and left the short pin 272 and the inverse course tooth plate 270, the clutch gear 208 meshes again with the gears 204 and 214 so as to begin the inverse rotation again. This alternate process facilitates the Venus sign repeatedly appearing on the moon/star ring 4 which imitates the revolution of the Venus about a 46° angle from left and right of the sun. The one-way gears 256 and 260 are provided to respectively mesh with the gear 262 to obviate mutual interruption, because they can only follow a predetermined direction and will be racing if rotate inversely.

The Mercury driving device is similar to that of the Venus which the conjunction period is 584 days, wherein the normal course is about 141 days and the inverse course is about 443 days. Because of that the clutch lever 210 leaves the normal course tooth plate 268 and the inverse course tooth plate 270, and the clutch gear disengages with gear 204 and 214 will spend 5 days, equally, both the normal course and the inverse course of Venus must also deduct 5 days. If the Venus normal course internal tooth band 150 has 68 tooth [(141−5)÷2=68], the Venus inverse course internal tooth band 146 has 73 tooth (443−5)÷6=73], and both of them are shifted a teeth daily by the tooth band 65, and if the gear 214 has 12 tooth and the worm stem 216 is composed of two worm stems, so that the worm wheel 218 shifts a teeth must be 6 days. Because the tooth number on the elongate pinion 232 equals to that of the worm wheel 218, a circulation of the Venus inverse course internal tooth band 146 must spend 438 days (6×73=438). On the other hand, if the bevel gear 238 shifts a teeth daily and the elongate pinion 244 has the tooth number as half as that of the bevel gear 238, so that the elongate pinion 244 must shift a teeth per 2 days. It is otherwise that the Venus normal course internal tooth band 150 must circulate once per 136 days (2×68=136). Further, the length of normal course from Venus sign 18 must equal to the length of its inverse course and this length per the circumferential length of the Venus normal course external tooth band 152 must equal to the circumferential length of the one-way gear 260 per the circumferential length of the gear 258, and the ratio between the length of normal course or inverse course of Venus sign and the circumferential length of the Venus inverse course external tooth band 148 must equal to the ratio between the circumferential length of the one-way gear 256 and the gear 254.

The conjunction period of Mercury is 116 days, wherein the normal course spends 45 days and the inverse course spends 71 days. Similar to the clutch system as recited above for Venus, both the normal course and the inverse course for Mercury must also deduct 5 days for each. So that the Mercury normal course internal tooth band 142 can be 80 tooth [(45−5)×2=80] and the Mercury inverse course internal tooth band 138 can be 66 tooth (71−5=66). In this driving device, the elongate pinion 139 is firstly driven by the tooth band 65 also and in turn the Mercury inverse course internal tooth band 138 is actuated to run to shift a teeth daily and finishes an inverse course per 66 days. Because the tooth number of the elongate pinion 143 is twice as the tooth number of the bevel gear 141, so that when the bevel gear 141 shift a teeth daily, the elongate pinion 143 must shift two tooth daily in order to drive the Mercury normal course internal tooth band 142 to circulate once per 40 days (80÷2=40). Furthermore, the Mercury orbits within a range about 25° left and right relative to the sun symbol on the space-time tracker. It is understood that the circumferential length of the Mercury inverse course external tooth band 140 per the inverse circulation length of the Mercury sign 15 must equal to the circumferential length of the gear 255 per the circumferential length of the one-way gear 257. Similarly, the circumferential length of the Mercury normal course external tooth band 144 per the normal circulation length of the Mercury sign 16 must equal to the ratio of the circumferential lengths between the gear 263 and the one-way gear 261.

Figure 13:
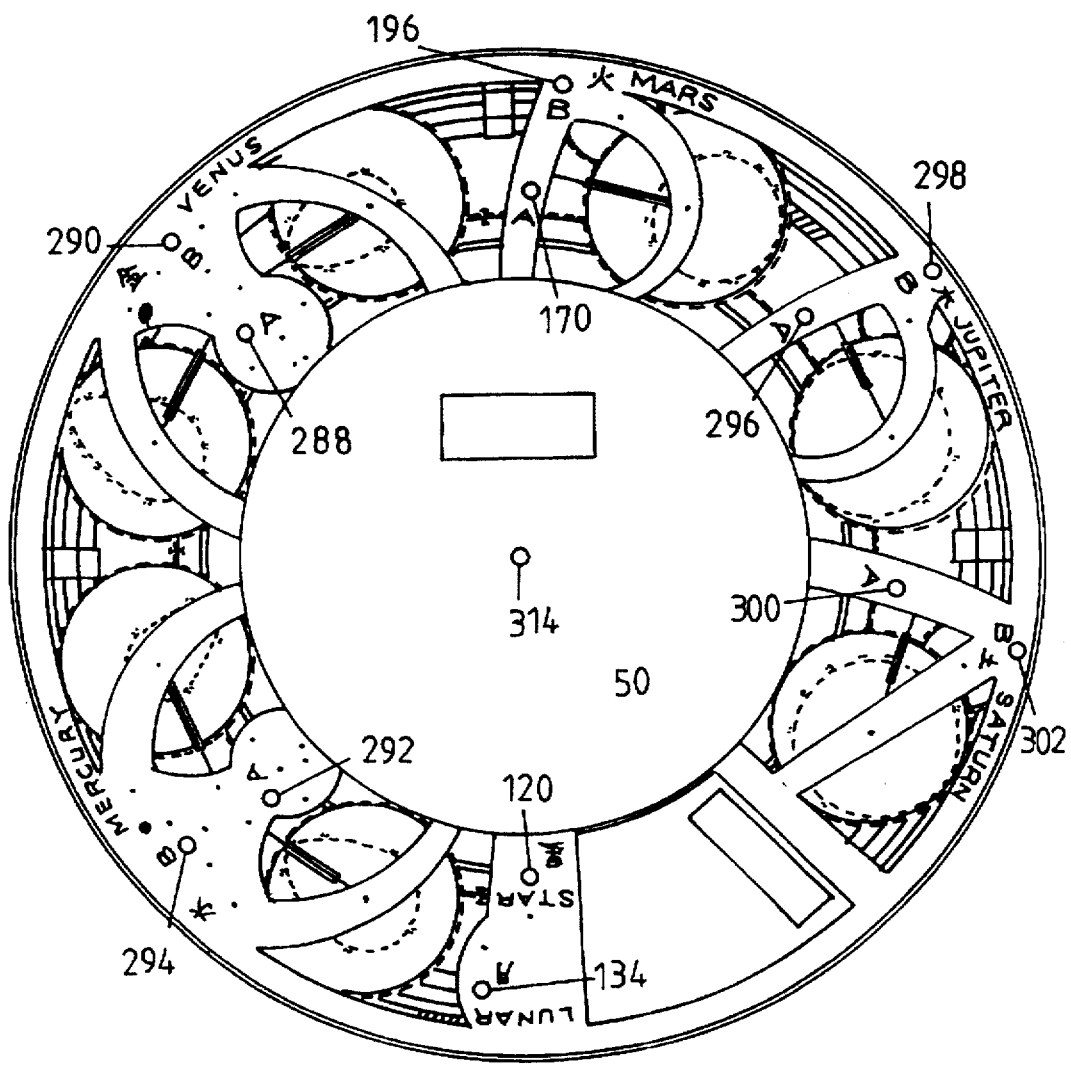
FIG. 13 is a rear side view to show a plurality of winding buttons disposed on the back of an accessary plate.

Referring to FIG. 13 which is viewed from the back side of the space-time tracker while the back cover is removed. You'll see that there are 13 adjustment winding buttons spacedly disposed thereon, wherein the button 314 at the center of the tracker adjusts the hour hand (including the terrestrial map and the fixed latitude observation chart), minute hand and second hand as it does in a conventional clock, the button 120 adjusts the position of the star atlas 34, the button 134 adjusts the position of the moon phase sign 14, the A button 292 and B button 294 adjust the position of Mercury sign 15, the A button 288 and B button 290 adjust the position of Venus sign 18, the A button 170 and B button 196 adjust the position of Mars sign 20, the A button 296 and B button 298 adjust the position of the Jupiter sign 22, and A button 300 and B button 302 adjust the position of the Saturn sign 24. The adjustment is performed no different from that of the operation of a crown in a conventional watch which is firstly opening the back cover 52 and pulling the button up and then swings the button while watches the front side of the tracker. When the adjustment is achieved, pushes the button down and covers the back cover again.

The adjustment of the driving devices for the planets is an elaborate work because they rotate not in constant or mean speed. Thus the eccentric tooth bands have to be delicately adjusted at first, then is the positions of the signs, so as to readily determine the periodical appearance of the planets.

The above recited A buttons are provided to adjust those eccentric internal tooth bands and B buttons are provided to adjust the positions of the signs of the planets. When adjusting an eccentric internal tooth band, one has to check, via the windows on the accessary plate 50, whether or not the elongate pinion meshes correctly with the eccentric internal tooth band and counts the number of the Ten-days thereon. The structure of those winding buttons as well as their mechanisms can refer to those of a conventional watch.

Referring to FIG. 9 of a sectional view shows a structure of adjustment device for adjusting the Venus pattern in the tracker. The adjustment device comprises a central axis vertically and pivotally disposed between the moon/star ring 4 and the accessary plate 50. The central axis has a pair of first and second cylinder sections 318 and 312, wherein the first cylinder section 310 inserts through the accessary plate 50 and connects with a B button 290, the first and second rectangular sections 306 and 308 are slidingly and respectively coupled with gears 262 and 264 which have their centrally formed rectangular apertures to cope with, so that the central axis is rotated by gear 262 and then actuates the gear 264 to move, and the Venus tooth band 58 is in turn rotated by gear 264. If the B button 290 is pulled up and the first cylinder section 312 shifts into the central aperture of gear 262 that the gear 262 will be racing and disengages with the central axis. Therefore, the winding of the B button 290 can only actuate the gear 264 swinging to move the tooth band 58 without effecting the gear 262 to run. After the adjustment to the tooth band 58 is accomplished, push down the B button 290 so as to regain the device into it's normal state. The adjustment devices for other planets are similar to this device and therefore not to be described. Furthermore, a pair of sleeves 384 are wrapped on the central axis and positioned respectively above and beneath the gear 262, thus the shift of the central axis will not mar the structural stability of the device.

Not that the specification relating to the above embodiment should be construed as to exemplary rather than as limitative of the presnet invention, with many variations and modifications being readily attainable by a person of average skill in the art without departing from the spirit or scope thereof, as defined by the appended claims and their legal equivalents.

I claim:

1. A space-time tracker for tracking the variations of the time and space comprising
    a circular case;
    a seat plate fixed to said case therein, said seat plate comprising a central aperture, a circumferential thread and a general tooth band and a star atlas tooth band concentrically disposed on the back side thereof;
    a moon/star ring fixed to said case adjacent said seat plate having a plurality of windows of planet signs thereon and a plurality of circular slots on the back side thereof for recceiving a plurality of planet annular displays;
    a transparent date/hour ring fixedly attached to said moon/star ring thereupon;
    a star atlas movably attached to said seat plate thereon;
    a transparent terrestrial map combined with a transparent fixed latitude observation chart thereon and an hour hand therein movably attached on said star atlas;
    a minute hand and a second hand sequentially pivoted to a spindle projected upward from the central aparture and sliding on said fixed latitude observation chart;
    a transparent face fixed to said case on the uppermost position;
    a clock mechanism with a battery cell centrally disposed on the back of said seat plate;
    a synchronic motor with a battery cell circumferentially disposed on the back of said seat plate;
    a plurality of driving devices for driving said plurality of planet annular displays circumferentially disposed on the back of said moon/star ring therearound and drove by said motor via said general tooth band;
    an accessary plate attached on said driving devices;
    a back cover closed on the back of said case on a lowermost position;
    whereby, said space-time tracker is synchronously driven by said clock mechanism and said synchronic motor to show simultanously the time and the locations of planets on the spot.

2. A space-time tracker as recited in claim 1 wherein said windows of signs on said moon/star ring include moon phases, waves, cross, arrow, ellipse and circle which respectively represent the Soon, the Mercury, the Venus, the Mars, the Jupiter and the Saturn.

3. A space-time tracker as recited in claim 1 wherein said date/hour ring has graduation of 24 hours, a sun symbol located at a 12 hour, and a lunar calendar disposed therearound.

4. A space-time tracker as recited in claim 2, wherein said sign for Mercury repeatedly appears on said moon/star ring at positions within an angle about 24° before and after said sun symbol.

5. A space-time tracker as recited in claim 2, wherein said sign for Venus repeatedly appears on said moon/star ring at positions within an angle about 46° before and after said sun symbol.

6. A space-time tracker as recited in claim 2, wherein said signs for Mars, Jupiter and Saturn repeatedly appear on said moon/star ring and respectively align a series of concentrical circles relative to the center of said space-time tracker.

7. A space-time tracker as recited in claim 1, wherein said planet annular displays are in the same color as that of said moon/star ring and each has a small color band thereon.

8. A space-time tracker as recited in claim 7 wherein a moon phase annular display circulates once per 29.5 days.

9. A space-time tracker as recited in claim 7 wherein a Mercury annular display circulates normally and inversely once upon a conjunction period of 116 days.

10. A space-time tracker as recited in claim 7 wherein a Venus annular display circulates normally and inversely once upon a conjunction period of 584 days.

11. A space-time tracker as recited in claim 7 wherein a Mars annular display circulates upon a conjunction period of 780 days.

12. A space-time tracker as recited in claim 7 wherein a Jupiter annular display circulates once upon a conjunction period of 399 days.

13. A space-time tracker as recited in claim 7 wherein a Saturn annular display circulates once upon a conjunction period of 378 days.

14. A space-time tracker as recited in claim 1 wherein said terrestrial map, said fixed latitude observation chart and said hour hand are drove by said clock mechanism to circulate once per 24 hours.

15. A space-time tracker as recited in claim 1 wherein said star atlas are drove by said motor to circulate once per 365 days.

16. A space-time tracker as recited in claim 1 wherein said a plurality of driving devices include a Mars driving device, a Jupiter driving device, a Saturn driving device, a Mercury driving device and a Venus driving device.

17. A space-time tracker as recited in claim 16 wherein said Mars, Jupiter and Saturn driving devices each includes an oval eccentric internal tooth band, a circular external tooth band, a worm stem, a worm wheel, a first bevel gear, an elongate pinion and a plurality of gears meshed and rotated in concert with one another to drive their own annular displays.

18. A space-time tracker as recited in claim 17 wherein said elongate pinion has a first end coaxially connected with said first bevel gear and a second end meshed with said internal tooth band and pointed to the co-revolving center of the internal and external tooth bands.

19. A space-time tracker as recited in claim 17 wherein said internal tooth band is in eccentric rotation and said external tooth band is in circular rotation.

20. A space-time tracker as recited in claim 16 wherein said Mercury and Venus driving devices each has a pair of oval eccentric internal tooth band and a circular external tooth band, a pair of worm stems, a pair of worm wheels, a pair of first bevel gears, a pair of elongate pinions and a plurality of gears meshed and rotated in concert with one another to normally or inversely drive their own annular displays.

21. A space-time tracker as recited in claim 20 wherein said elongate pinions each has a first end coaxially connected with one of the first bevel gears and a second end meshed with one of the internal tooth band and pointed to the co-revolving center of a pair of said internal and external tooth bands.

22. A space-time tracker as recited in claim 20 further has a clutch assembly disposed therebetween, said clutch assembly including a flexible clutch lever connected to a clutch gear, a normal course tooth plate coaxial with an inverse course tooth plate and in slightly inclined relationship with one another, a short pin on each of said tooth plate, a pair of six-leaf rotors and a pair of one-way gears rotatably disposed on the lateral sides respectively, and a push lever disposed under said one-way gear which is in turn engaged with said first gear of a normal course or inverse course driving device.

23. A space-time tracker as recited in claim 1, further has a plurality of winding buttons rotatably disposed and spaced apart on the back of said accessary plate for respectively adjusting the positions of clock hands, said internal tooth band of said planet driving devices and said annular displays.

* * * * *